(12) United States Patent
Kitta et al.

(10) Patent No.: US 12,112,671 B2
(45) Date of Patent: Oct. 8, 2024

(54) ELECTRONIC DEVICE, CONTROL METHOD OF ELECTRONIC DEVICE, AND NON-TRANSITORY COMPUTER-READABLE STORAGE MEDIUM

(71) Applicant: CASIO COMPUTER CO., LTD., Tokyo (JP)

(72) Inventors: Noriyuki Kitta, Tokyo (JP); Hiroyoshi Ogawa, Koganei (JP); Masatoshi Watanuki, Sagamihara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/348,883

(22) Filed: Jul. 7, 2023

(65) Prior Publication Data
US 2024/0054929 A1     Feb. 15, 2024

(30) Foreign Application Priority Data
Aug. 9, 2022 (JP) .................................. 2022-126730

(51) Int. Cl.
*G09G 3/14*     (2006.01)
*G04G 9/00*     (2006.01)
(Continued)

(52) U.S. Cl.
CPC .............. *G09G 3/14* (2013.01); *G04G 9/007* (2013.01); *G04G 21/04* (2013.01); *H04R 1/028* (2013.01);
(Continued)

(58) Field of Classification Search
CPC .. G09G 3/14; G09G 2354/00; G09G 2370/16; G04G 9/007; G04G 21/04; H04R 1/028; H04R 2499/15; G08B 5/36
See application file for complete search history.

(56) References Cited

U.S. PATENT DOCUMENTS

| | | |
|---|---|---|
| 5,572,488 A | 11/1996 | Yamada et al. |
| 2015/0186092 A1 | 7/2015 | Francis et al. |

(Continued)

FOREIGN PATENT DOCUMENTS

| | | |
|---|---|---|
| EP | 2955596 A2 | 12/2015 |
| EP | 3079044 A1 | 10/2016 |

(Continued)

OTHER PUBLICATIONS

Partial European Search Report dated Jan. 8, 2024, issued in counterpart European Application No. 23187775.4.
(Continued)

*Primary Examiner* — Md Saiful A Siddiqui
(74) *Attorney, Agent, or Firm* — Holtz, Holtz & Volek PC

(57) ABSTRACT

An electronic device includes a communication module configured to communicate with an external device having a battery capacity greater than a battery capacity of the electronic device, a display, and at least one processor. The processor is configured to control the communication module to transmit a communication start request to the external device, and in a case where the electronic device receives notification information from the external device, change an operation mode of the electronic device from a first mode to a second mode. The display performs displaying a normal operation of the electronic device in the first mode, and the display performs displaying based on the notification information in the second mode.

19 Claims, 10 Drawing Sheets

(51) Int. Cl.
  *G04G 21/04* (2013.01)
  *H04R 1/02* (2006.01)
  *G08B 5/36* (2006.01)

(52) U.S. Cl.
  CPC ........... *G08B 5/36* (2013.01); *G09G 2354/00* (2013.01); *G09G 2370/16* (2013.01); *H04R 2499/15* (2013.01)

(56) References Cited

U.S. PATENT DOCUMENTS

| | | | |
|---|---|---|---|
| 2015/0256593 A1* | 9/2015 | Kelani | G06F 3/04883 715/740 |
| 2015/0346694 A1 | 12/2015 | Hoobler et al. | |
| 2015/0362893 A1 | 12/2015 | Masserot et al. | |
| 2017/0115713 A1* | 4/2017 | Shin | G06F 3/03545 |
| 2017/0221321 A1 | 8/2017 | Inoue | |
| 2017/0343965 A1 | 11/2017 | Kyou et al. | |
| 2018/0164973 A1 | 6/2018 | Kim et al. | |
| 2018/0176808 A1* | 6/2018 | Suyama | G06F 3/14 |
| 2019/0041807 A1 | 2/2019 | Masserot et al. | |
| 2020/0052922 A1 | 2/2020 | Lee et al. | |
| 2020/0389551 A1 | 12/2020 | Vaughn et al. | |
| 2021/0250744 A1* | 8/2021 | Kang | H04W 4/80 |
| 2022/0286314 A1* | 9/2022 | Meyer | H04N 7/147 |
| 2022/0378372 A1* | 12/2022 | Bollella | A61B 5/024 |
| 2023/0081032 A1* | 3/2023 | Ardaud | H04W 4/90 455/404.1 |
| 2023/0254401 A1 | 8/2023 | Nagasaka | |

FOREIGN PATENT DOCUMENTS

| | | |
|---|---|---|
| EP | 3608750 A1 | 2/2020 |
| JP | S6291289 U | 6/1987 |
| JP | 2008039396 A | 2/2008 |
| JP | 2015021740 A | 2/2015 |
| JP | 2016081292 A | 5/2016 |
| JP | 2017212676 A | 11/2017 |
| JP | 2018044931 A | 3/2018 |
| JP | 2019109158 A | 7/2019 |
| JP | 2020098107 A | 6/2020 |
| JP | 2020148782 A | 9/2020 |
| JP | 2020197537 A | 12/2020 |
| WO | 2013114923 A1 | 8/2013 |
| WO | 2021220812 A1 | 11/2021 |

OTHER PUBLICATIONS

Extended European Search Report (EESR) dated May 21, 2024, issued in counterpart European Application No. 23187775.4.

Japanese Office Action (and English translation thereof), dated Jun. 11, 2024, issued in counterpart Japanese Application No. 2022-126730.

* cited by examiner

| ITEM | DATA CONTENT |
|---|---|
| I1 NOTIFICATION FLAG INFORMATION | 0 or 1 |
| I2 IMAGE INFORMATION | DATA OF NUMBERS OF VERTICAL AND HORIZONTAL DOTS, IMAGE DATA |
| I3 SOUND INFORMATION | DATA FOR DESIGNATING ON/OFF OF SOUND OUTPUT IN UNIT OF 1/16 SECOND |
| I4 LIGHT EMISSION INFORMATION | DATA FOR DESIGNATING LIGHT EMISSION PATTERN |
| I5 INDICATOR INDICATING POSITION INFORMATION | DATA FOR DESIGNATING INDICATING POSITION OF MODE HAND |
| I6 SEGMENT DISPLAY INFORMATION | DATA FOR DESIGNATING LIGHTING MODE OF EACH SEGMENT OF SECOND SEGMENT DISPLAY REGION |

FIG. 6

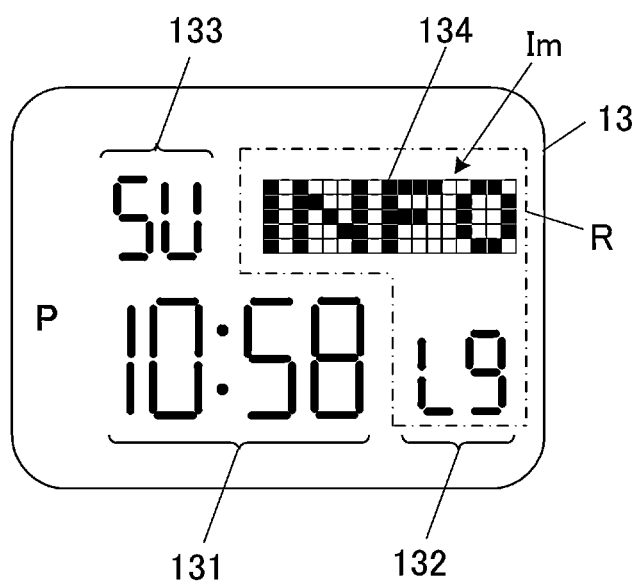

ELECTRONIC DEVICE, CONTROL METHOD OF ELECTRONIC DEVICE, AND NON-TRANSITORY COMPUTER-READABLE STORAGE MEDIUM

CROSS-REFERENCE TO RELATED APPLICATIONS

This application claims priority based on Japanese Patent Application No. 2022-126730 filed on Aug. 9, 2022, and includes the specification, claims, abstract and drawings of Japanese Patent Application No. 2022-126730 by reference.

BACKGROUND

The present disclosure relates to an electronic device, a control method of an electronic device, and a non-transitory computer-readable storage medium.

In recent years, even in small electronic devices such as wristwatches, a technology for acquiring necessary information through data communication with an external device and reflecting the information in operations has been used. In such an electronic device, it is required to suppress power consumption to a low level so that a continuous operation for a long time can be performed with a battery having a small capacity (for example, a button-type battery). In particular, since data communication with an external device consumes a large amount of power, it is necessary to suppress the communication frequency and communication time. For example, in JP2008-39396A, power consumption is suppressed by performing data communication only at a limited timing for acquiring a standard time and not performing data communication during other periods.

SUMMARY

One illustrative aspect of the present disclosure provides an electronic device including: a communication module configured to communicate with an external device having a battery capacity greater than a battery capacity of the electronic device; a display; and at least one processor. The processor is configured to: control the communication module to transmit a communication start request to the external device; and in a case where the electronic device receives notification information from the external device, change an operation mode of the electronic device from a first mode to a second mode. The display performs displaying a normal operation of the electronic device in the first mode, and the display performs displaying based on the notification information in the second mode.

Another illustrative aspect of the present disclosure provides a control method of an electronic device, the electronic device including a display and a communication module configured to communicate with an external device having a battery capacity greater than a battery capacity of the electronic device. The control method includes: controlling the communication module to transmit a communication start request to the external device; and in a case where the electronic device receives notification information from the external device, changing an operation mode of the electronic device from a first mode to a second mode. The display performs displaying a normal operation of the electronic device in the first mode, and the display performs displaying based on the notification information in the second mode.

Still another illustrative aspect of the present disclosure provides a non-transitory computer-readable medium storing a computer program readable by a computer of an electronic device, the electronic device including a display and a communication module configured to communicate with an external device having a battery capacity greater than a battery capacity of the electronic device. The computer program, when executed by the computer, causes the computer to perform: controlling the communication module to transmit the communication start request to the external device; and in a case where the electronic device receives notification information from the external device, changing an operation mode of the electronic device from a first mode to a second mode. The display performs displaying a normal operation of the electronic device in the first mode, and the display performs displaying based on the notification information in the second mode.

BRIEF DESCRIPTION OF THE SEVERAL VIEWS OF THE DRAWING

FIG. 5 shows contents of notification data.

FIG. 6 is a view showing the display unit when the electronic timepiece is operating in a notification mode.

DETAILED DESCRIPTION

Hereinafter, illustrative embodiments of the present disclosure will be described with reference to the drawings.

First Illustrative Embodiment

{Configuration of Information Processing System}

Figure 1:
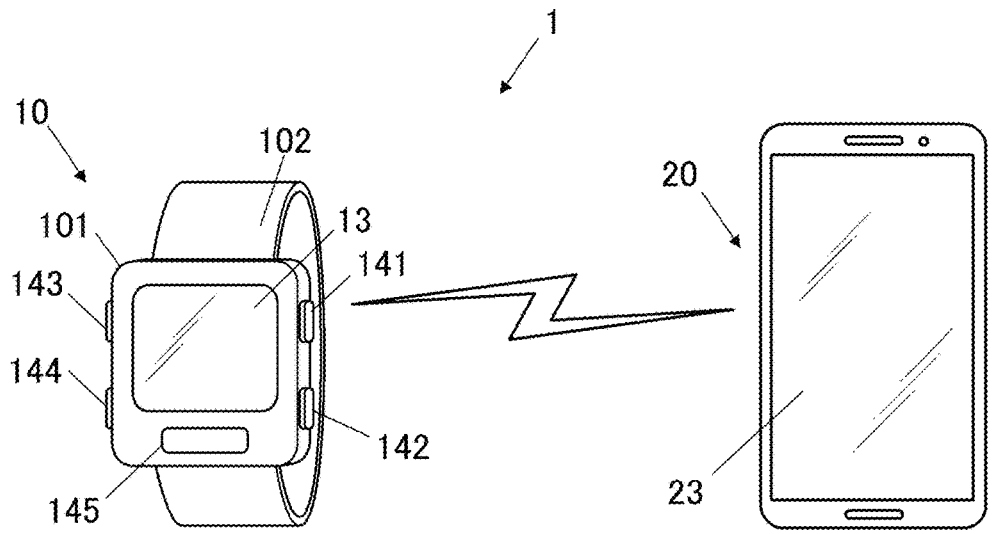
FIG. 1 shows an information processing system according to a first illustrative embodiment.

FIG. 1 shows an information processing system 1 according to a first illustrative embodiment.

The information processing system 1 includes an electronic timepiece 10 (electronic device) and a smart phone 20 (external device).

The electronic timepiece 10 is a wristwatch that is worn on a user's wrist and used. The electronic timepiece 10 includes a body part 101 provided with a display unit 13, a first operation button 141 to a fifth operation button 145, and the like, and a belt 102 attached to the body part 101. In the present illustrative embodiment, the display unit 13 is configured to digitally display various types of information including a time. When the display unit 13 of the body part 101 is viewed from the front, a first operation button 141 is provided on an upper side of a right side surface of the body part 101, a second operation button 142 is provided on a lower side of the right side surface of the body part 101, a third operation button 143 is provided on an upper side of a left side surface, and a fourth operation button 144 is provided on a lower side of the left side surface. In addition, a fifth operation button 145 is provided below the display unit 13 in a front surface of the body part 101.

The electronic timepiece 10 is adapted to be able to perform data communication with the smart phone 20 by near field communication. In the present illustrative embodiment, BLE (which is an abbreviation for Bluetooth (registered trademark) Low Energy) is used as near field communication, but the standard of near field communication to be used is not limited thereto. The electronic timepiece 10 corresponds to a peripheral (slave device) in BLE, and the smart phone 20 corresponds to a central (master device) in BLE.

In addition to a basic timepiece mode of displaying a time, a date, a day of the week, and the like, the electronic timepiece 10 can operate in a notification mode of performing a display based on notification data ND (which is one example of notification information) (refer to FIGS. 2 and 4) received from the smart phone 20. The basic timepiece mode corresponds to "the first mode in which the display unit performs a display related to a normal operation of the own device (electronic device)". In addition, the notification mode corresponds to "the second mode in which the display unit performs a display based on the notification information". The basic timepiece mode and the notification mode will be described in detail later. Note that the electronic timepiece 10 can also operate in various operation modes such as a world timepiece mode for displaying a time in every corner of the world, an alarm mode for setting an alarm time, a stopwatch mode, and a timer mode, in addition to the basic timepiece mode and the notification mode. The world timepiece mode, the alarm mode, the stopwatch mode, and the timer mode may also be included in the "first mode".

The smart phone 20 is a terminal device that is mainly carried and used by a user, and has a call function, a data communication function, and various information processing functions. In the smart phone 20, an application program (hereinafter referred to as a cooperative application 221 (refer to FIG. 4)) for performing cooperative operations with the electronic timepiece 10 is installed. The smart phone 20 can set the electronic timepiece 10 (setting of an alarm time, a world time, etc.) or display stopwatch data obtained from the electronic timepiece 10 on the cooperative application 221.

When the smart phone 20 receives an advertise packet from the electronic timepiece 10 registered (i.e., paired) in advance by exchanging a public key or the like, the smart phone starts data communication with the electronic timepiece 10 by BLE. An operation in which the electronic timepiece 10, which is a peripheral, transmits an advertise packet corresponds to "transmitting a communication start request for starting data communication". On the other hand, the smart phone 20, which is a central, does not request communication start to the electronic timepiece 10. Note that the electronic timepiece 10 may also be adapted not to accept a communication start request from the smart phone 20.

In data communication with the electronic timepiece 10, the smart phone 20 receives device data 123 (device information) described later from the electronic timepiece 10, and transmits time data for time correction and notification data ND described above to the electronic timepiece 10. Further, during data communication for manual connection described later, the smart phone further transmits setting contents and the like set on the cooperative application 221 to the electronic timepiece 10.

{Configuration of Electronic Timepiece}

Figure 2:
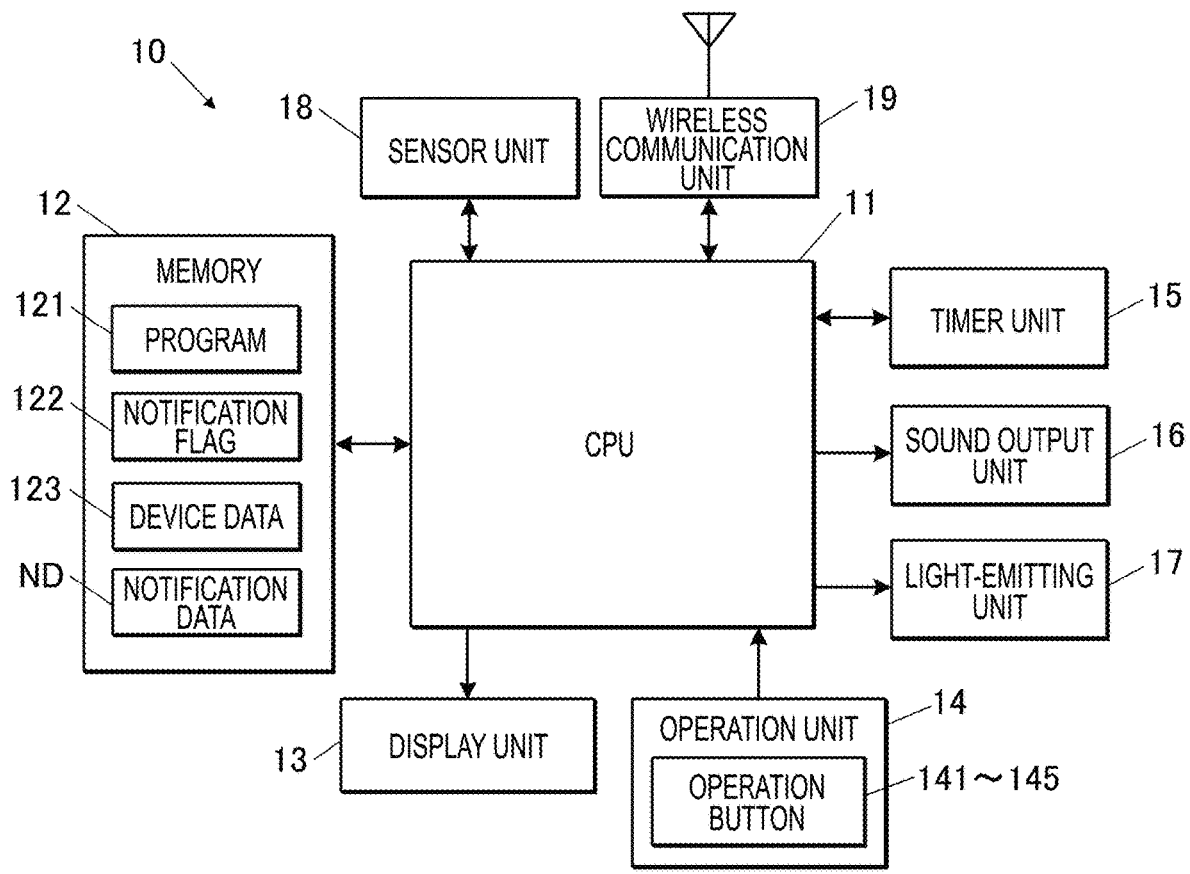
FIG. 2 is a block diagram showing a functional configuration of an electronic timepiece.

FIG. 2 is a block diagram showing a functional configuration of the electronic timepiece 10.

The electronic timepiece 10 includes a CPU 11 (which is an abbreviation for Central Processing Unit), a memory 12 (storage unit), a display unit 13, an operation unit 14, a timer unit 15, a sound output unit 16, a light-emitting unit 17, a sensor unit 18, a wireless communication unit 19 (communication unit), and the like.

The CPU 11 is a processor that controls an operation of each unit of the electronic timepiece 10 by reading and executing the program 121 stored in the memory 12 and performing various types of arithmetic processing. In the present illustrative embodiment, the CPU 11 corresponds to the "control unit". Note that the electronic timepiece 10 may include a plurality of processors (for example, a plurality of CPUs), and the plurality of processors may execute a plurality of processing that is executed by the CPU 11 of the present illustrative embodiment. In this case, the plurality of processors correspond to the "control unit". In this case, the plurality of processors may be involved in common processing, or the plurality of processors may independently execute different processes in parallel.

The memory 12 is a non-transitory recording medium that is readable by the CPU 11 as a computer. The memory 12 includes, for example, a non-volatile memory such as a flash memory. The memory 12 stores various types of data including a notification flag 122 (notification setting), device data 123, and notification data ND, in addition to the program 121. The program 121 is stored in the memory 12 in the form of computer-readable program codes. The memory 12 may include a RAM (which is an abbreviation for Random Access Memory) that is used for arithmetic processing of the CPU 11.

The notification flag 122 is notification setting data that is referenced when determining whether to perform a transition between the basic timepiece mode and the notification mode, in notification control processing described later. The notification flag 122 is, for example, one-bit data.

The device data 123 includes information related to a user's operation history on the first operation button 141 to the fifth operation button 145 of the operation unit 14, information related to a time being measured or a measured time in the stopwatch mode, and information related to a posture, an operation, a history thereof or the like of the own device by the sensor unit 18.

The notification data ND is data that is received from the smart phone 20, and includes various types of setting information that designates an operation in the notification mode. The content of the notification data ND will be described later.

The display unit 13 is a liquid crystal monitor that performs a digital display under control of the CPU 11.

Figure 3:
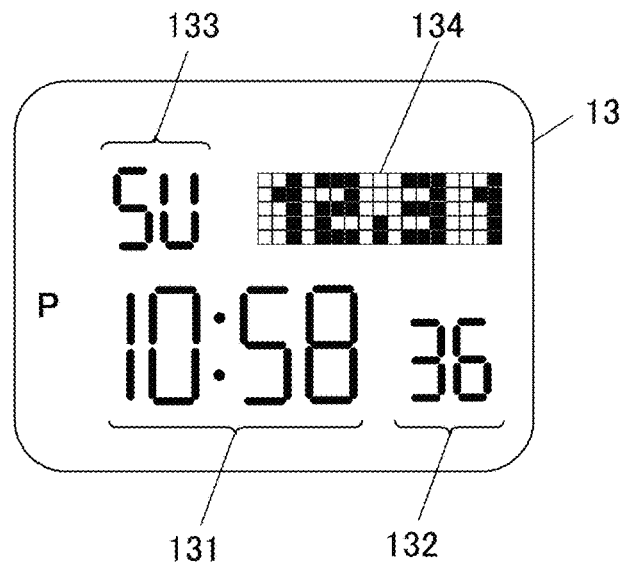
FIG. 3 is a view showing a display unit when the electronic timepiece is operating in a basic timepiece mode.

FIG. 3 is a view showing the display unit 13 when the electronic timepiece 10 is operating in the basic timepiece mode.

As shown in FIG. 3, the display unit 13 includes a first segment display region 131 for displaying an hour and a minute, a second segment display region 132 for displaying a second or the like, a third segment display region 133 for displaying a day of the week, or the like, and a dot display region 134 (image display region) for displaying a date, or the like.

The first segment display region 131 to the third segment display region 133 are so-called 7-segment type display regions, and display numbers and characters by switching between on and off states of a drive voltage for a segment electrode constituting each segment to switch between lighting and non-lighting of each segment (to switch a drive state of a liquid crystal layer).

The dot display region 134 is here a display region having rectangular dot electrodes aligned in a matrix shape of 5 vertical rows and 17 horizontal columns. The dot display region 134 displays an image such as a number, a character or a figure according to arrangement of lighted dots by individually switching between on and off states of the drive electrode for each dot electrode to switch between lighting and non-lighting of each dot.

Note that the display unit 13 may further include display elements not shown in FIG. 3 (for example, display elements for displaying various statuses of the electronic timepiece 10, and the like).

The operation unit 14 is an operation interface including the first operation button 141 to the fifth operation button 145 described above. The operation unit 14 receives user operations on the first operation button 141 to the fifth operation button 145 (for example, an operation of pressing each operation button), and outputs an operation signal corresponding to each operation button to the CPU 11. In response to the operation signal, the CPU 11 executes processing corresponding to a function assigned to the operation button on which the user operation has been performed. A history of user operations on the operation unit 14 is stored in the device data 123.

Note that the operation unit 14 may further include other operation target members such as a crown. In addition, the operation unit 14 may have a touch panel provided superimposed on a display screen of the display unit 13.

The timer unit 15 is a timer module including an oscillator circuit, a frequency divider circuit, a timer circuit, and the like. In the timer unit 15, the frequency divider circuit frequency-divides a clock signal generated by the oscillator circuit, and the timer circuit counts the frequency-divided signal, so that current date and time are derived and held.

The sound output unit 16 is a speaker that outputs a sound such as a beep sound in response to a control signal transmitted from the CPU 11. The sound output unit 16 of the present illustrative embodiment can switch between an output and a non-output of the sound in a unit of $1/16$ second. Further, the sound output unit 16 may be configured to switch a frequency of the sound to be output in two or more stages.

The light-emitting unit 17 includes a light-emitting element such as an LED (which is an abbreviation for Light Emitting Diode), and emits light in a pattern according to a control signal transmitted from the CPU 11. The light-emitting unit 17 may emit light in a direction of illuminating an inside of a display surface of the display unit 13 or may emit light toward the outside of the body part 101.

The sensor unit 18 includes at least one of a 3-axis acceleration sensor, a 3-axis gyro sensor, and a 3-axis geomagnetic sensor, and detects a posture and a motion state of the own device (electronic timepiece 10). The sensor unit 18 includes an amplifier that amplifies analog detection signals output from the respective sensors, respectively, and an AD converter that converts the amplified analog signals into digital data and outputs the same to the CPU 11.

The wireless communication unit 19 is a communication module having an antenna, a modulation/demodulation circuit, a signal processing circuit, and the like, and performs wireless data communication with the smart phone 20 according to the BLE standard.

{Configuration of Smart Phone}

Figure 4:
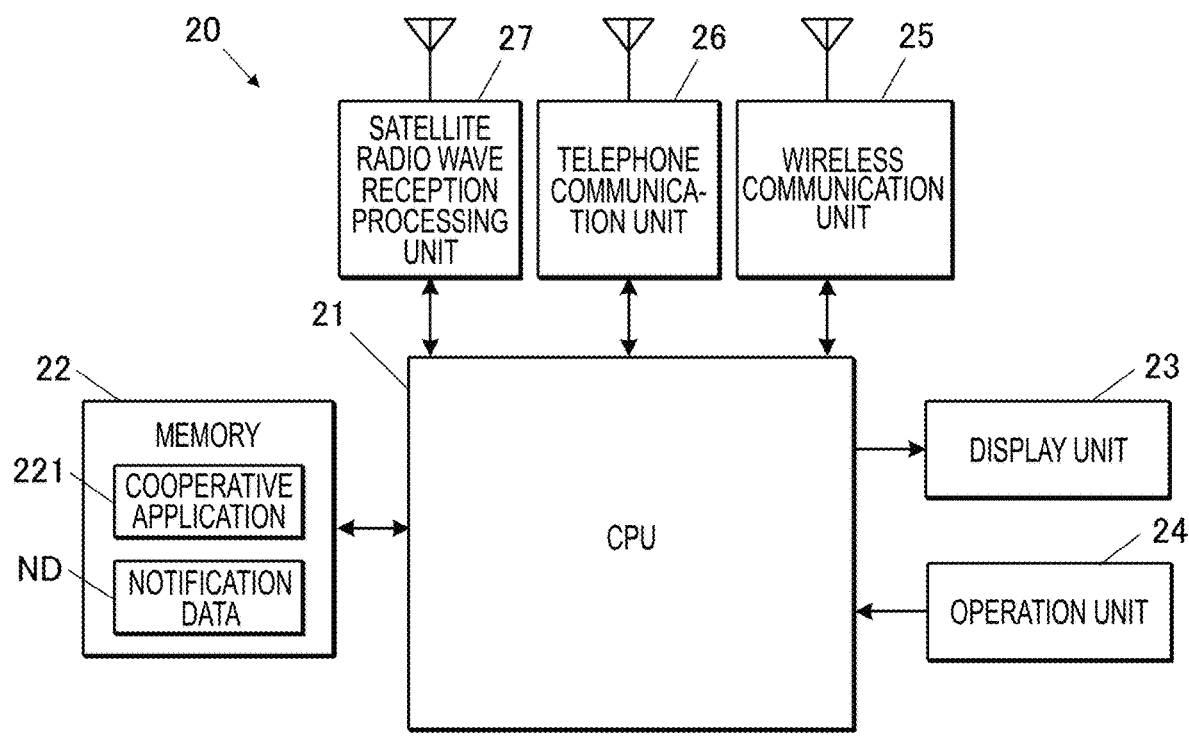
FIG. 4 is a block diagram showing a functional configuration of a smart phone.

FIG. 4 is a block diagram showing a functional configuration of the smart phone 20.

The smart phone 20 includes a CPU 21, a memory 22, a display unit 23, an operation unit 24, a wireless communication unit 25, a telephone communication unit 26, a satellite radio wave reception processing unit 27, and the like.

The CPU 21 is a processor that controls an operation of each unit of the smart phone 20 by reading and executing various programs such as a cooperative application 221 stored in the memory 22 and performing various arithmetic processing.

The memory 22 includes, for example, a non-volatile memory such as a flash memory. The memory 22 stores various types of data, such as notification data ND and identification data for identifying the paired electronic timepiece 10, in addition to various programs including the cooperative application 221.

The display unit 23 has a display screen and performs a digital display on the display screen under control of the CPU 21. Here, the display screen is a screen configured to perform a display in a dot matrix format, and is, for example, a liquid crystal display screen.

The operation unit 24 receives a user's input operation and outputs an input signal corresponding to the input operation to the CPU 21. The operation unit 24 includes a touch panel provided superimposed on the display screen of the display unit 23, and detects, as an input operation, contact of a user's finger or the like by the touch panel. Further, the operation unit 24 may have a hardware button, together with the touch panel or instead of the touch panel, and may be able to accept an input operation by the hardware button.

The wireless communication unit 25 is a communication module having an antenna, a modulation/demodulation circuit, a signal processing circuit, and the like, and performs wireless data communication according to wireless communication standards such as BLE and wireless LAN. For example, the wireless communication unit 25 performs wireless data communication with the electronic timepiece 10 by BLE.

The telephone communication unit 26 communicates with a mobile phone base station and the like, and transmits and receives voice data of telephone communication, packet data related to Internet connection, and the like.

The satellite radio wave reception processing unit 27 is a module that receives and decodes radio waves transmitted from positioning satellites of a GNSS (which is an abbreviation for Global Positioning Satellite System) such as a GPS (which is an abbreviation for Global Positioning System) and calculates the current position and date and time. The satellite radio wave reception processing unit 27 calculates the current position and date and time under control of the CPU 21, and outputs a result to the CPU 21. In this way, in the smart phone 20, accurate time can be obtained by the satellite radio wave reception processing unit 27, and time data related to the time is transmitted to the electronic timepiece 10, and is used to correct time in the electronic timepiece 10.

{Operation of Information Processing System}

Next, an operation of the information processing system 1 will be described.

The electronic timepiece 10 normally operates in the basic timepiece mode in which a time, a date, a day of the week and the like are displayed. As shown in FIG. 3, in the basic timepiece mode, an hour and a minute of time are displayed by the first segment display region 131, seconds of time are displayed by the second segment display region 132, a day of the week is displayed by the third segment display region 133, and a date is displayed by the dot display region 134. The displayed date and time in the basic timepiece mode reflect the date and time derived and maintained by the timer unit 15. The date and time derived by the timer unit 15 are corrected based on time data for time correction when the time data is received from the smart phone 20.

The electronic timepiece 10 periodically performs data communication with the smart phone 20 by BLE at a predetermined timing during the day (in the present illustrative embodiment, four times every 6 hours during the day) to acquire time data for time correction, and corrects the date and time derived by the timer unit 15. The communication connection with the smart phone 20 automatically performed at this timing is described as "automatic connection" below.

In addition, even when a predetermined user operation (for example, an operation of pressing the first operation button 141) for instructing time correction is performed, data communication with the smart phone 20 is started by BLE, in response to the user operation, and time data for time correction is obtained. In the below, the communication connection with the smart phone 20 performed in response to a user operation for instructing time correction is described as "manual time connection".

In addition, when predetermined another user operation (for example, an operation of pressing and holding the third operation button 143 for 3 seconds or longer) is performed, in addition to the time data for time correction, data related to various settings performed on the cooperative application 221 of the smart phone 20 is obtained and reflected in the operation settings and the like of the electronic timepiece 10. In the below, the communication connection with the smart phone 20 performed in response to a user operation for acquiring data related to the cooperative application 221 from the smart phone 20 in this way is described as "manual connection".

The communication connection between the electronic timepiece 10 and the smart phone 20 in the information processing system 1 of the present illustrative embodiment is limited to a case where it is started in response to a connection start request from the electronic timepiece 10 at the timings of the automatic connection, manual time connection, and manual connection described above. Therefore, even when information for a user is obtained or generated in the smart phone 20, push notification from the smart phone 20 to the electronic timepiece 10 cannot be performed at an arbitrary timing.

Therefore, in the information processing system 1 of the present illustrative embodiment, in each of the automatic connection, manual time connection, and manual connection described above, the electronic timepiece 10 receives the notification data ND from the smart phone 20, and the electronic timepiece 10 notifies the user based on the notification data ND. This makes it possible to notify the user at the earliest possible timing, even in a communication connection mode of the present illustrative embodiment in which push notification from the smart phone 20 to the electronic timepiece 10 cannot be performed.

Specifically, in each of the automatic connection, manual time connection and manual connection described above, first, the device data 123 including at least one of information related to a state of the electronic timepiece 10 and information related to an operation history is transmitted from the electronic timepiece 10 to the smart phone 20. In addition, in the smart phone 20, notification data ND, which designates a notification content and a notification mode to the user, is generated based on the received device data 123. Then, the notification data ND is transmitted from the smart phone 20 to the electronic timepiece 10. For example, the notification data ND for notifying the user of the usage conditions of the electronic timepiece 10 may be generated based on information related to the state and operation history of the electronic timepiece 10. In addition, the notification data ND for notifying information that is likely to attract the user's interest may be generated based on the information related to the state and operation history of the electronic timepiece 10.

Note that the device data 123 transmitted from the electronic timepiece 10 in certain data communication may be reflected in the notification data ND that is to be transmitted to the electronic timepiece 10 in next data communication. In addition, the transmission of the device data 123 may be omitted, and the smart phone 20 may generate the notification data ND without depending on the device data 123.

When the electronic timepiece 10 receives the notification data ND, the electronic timepiece shifts an operation mode to a notification mode in which a display based on the notification data ND is performed. In the notification mode, the electronic timepiece 10 performs an operation designated by the notification data ND.

FIG. 5 shows contents of the notification data ND.

The notification data ND includes notification flag information I1, image information I2, sound information I3, light emission information I4, indicator indicating position information I5 (indicating position information), and segment display information I6.

The notification flag information I1 is one-bit data that takes any one value of "1 (on)" instructing transition to the notification mode and "0 (off)" instructing not to transition to the notification mode. When the electronic timepiece 10 receives the notification data ND, a content of the notification flag information I1 is reflected (copied) in the notification flag 122 in the memory 12.

The image information I2 includes data relating to an image Im (refer to FIG. 6) that is to be displayed in the dot display region 134 of the display unit 13 in the notification mode. Specifically, the image information I2 includes data indicating the number of dots in the vertical and horizontal directions of the image Im, and image data of the image Im (data indicating on/off of each dot).

The sound information I3 includes data that designates an output mode of sound by the sound output unit 16 in the notification mode. The sound information I3 includes bit data that designates on/off of sound in a unit of 1/16 second, for example. The number of the bit data can be set, for example, to about 160 bits (equivalent to 10 seconds). The sound information I3 may contain data that designates a frequency of sound to be output.

The light emission information I4 includes data that designates a light emission mode by the light-emitting unit 17 in the notification mode. The light emission information I4 may be data that designates any one of a plurality of preset light emission patterns, or may be data that directly designates on/off timings of light emission by the light-emitting unit 17.

The indicator indicating position information I5 includes data that designates an indicating position of an indicator in the notification mode, when the electronic timepiece 10 has an indicator (e.g., a mode hand (which may also be referred to as a mode indicator) 137 (refer to FIGS. 11 and 12)). As in the electronic timepiece 10 of the present illustrative embodiment, when no indicator is provided, the indicator indicating position information I5 is not used.

The segment display information I6 includes data that designates a lighting mode of each segment in the second segment display region 132 in the notification mode.

FIG. 6 is a view showing the display unit 13 when the electronic timepiece 10 is operating in the notification mode.

When the electronic timepiece 10 receives the notification data ND, the content of the notification flag information I1 is reflected in the notification flag 122. When the notification flag 122 becomes "1 (on)", the operation mode of the electronic timepiece 10 transitions to the notification mode. As shown in FIG. 6, in the notification mode, the image Im is displayed based on the image information I2 included in the notification data ND in the dot display region 134. In the example shown in FIG. 6, an image Im of characters "INFO", which indicates that there is new information, is displayed in the dot display region 134. A size of the image Im in FIG. 6 is 5 vertical dots×17 horizontal dots, which is the same as the size of the dot display region 134. However, the present invention is not limited thereto. For example, the number of vertical dots of the image Im may be made larger than 5 dots, and the image may be scrolled in the vertical direction in the dot display region 134.

Figure 7:
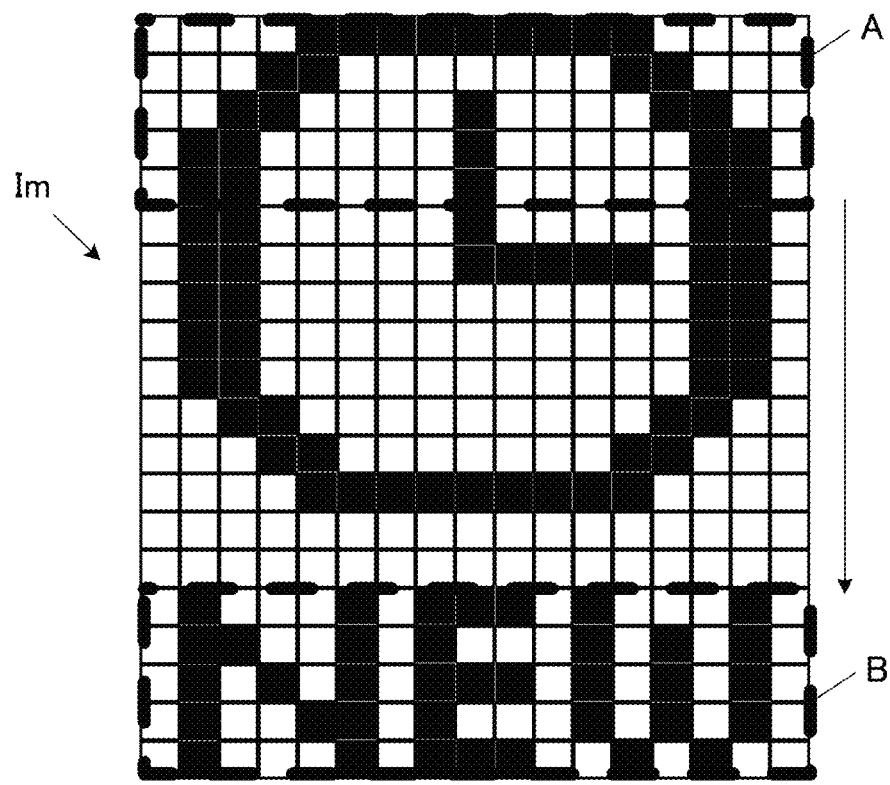
FIG. 7 shows another example of an image that is displayed in a dot display region.

FIG. 7 shows another example of the image Im that is displayed in the dot display region 134.

A size of the image Im shown in FIG. 7 is 20 vertical dots×17 horizontal dots, and an illustration of a timepiece is included at an upper portion of the image Im, and characters "NEW" are included at a lower portion. The image Im is displayed, for example, when notifying the user that there is a new timepiece. When the image Im is displayed in the dot display region 134, first, a range A of 5 dots from the top, including an upper portion of the timepiece, is displayed. Next, the image is switched at a predetermined frame rate such that the display range goes downward one dot by one dot in FIG. 7, and finally, a range B of 5 dots from the bottom, including the characters "NEW", is displayed. Thereby, in the dot display region 134, the image Im is displayed so as to scroll downward from the upper end.

The image Im that is displayed in the dot display region 134 is not limited to those illustrated in FIGS. 6 and 7. For example, the user may be notified that there is new information, an event or the like in a service by setting the image Im (image of a character, image of a sign, etc.) related to the service such as a metaverse that the user uses. Further, an amount of information to be notified to the user may be increased by setting the image Im including characters spanning over a plurality of rows.

Returning to FIG. 6, in the notification mode, a display is performed in the second segment display region 132 according to the segment display information I6 included in the notification data ND. Here, "L9" indicating that the user's level is "9" is displayed. The user level may be, for example, a value related to a number of times or a frequency of obtaining the notification data ND in a certain application or a certain service of the smart phone 20. The value of the number of obtaining times or the obtaining frequency may be, for example, a value in one day or a value in a predetermined period. Further, the content that is displayed in the second segment display region 132 may be explanation information or supplementation information related to the image Im displayed in the dot display region 134. For example, when the image Im indicates that there is a brand-new timepiece, characters or numbers indicating at least a part of identification information (model number, product name, nickname, etc.) of the brand-new timepiece are displayed in the second segment display region 132. Note that the display in the second segment display region 132 is not limited to the user level, and may be any information that can be expressed by a combination of two numbers or letters. For example, a two-letter code that can be referenced in a reference table possessed by the user may be used, and information corresponding to the code may be grasped by the user from the reference table.

In this way, in the notification mode, a notification based on the notification data ND is displayed in a notification region R including the second segment display region 132 and the dot display region 134 of the display unit 13.

On the other hand, even in the notification mode, the display of the hour and minute by the first segment display region 131 and the display of the day of the week by the third segment display region 133 are continuously performed. In this way, in the notification mode, a part of the display in the basic timepiece mode may be continuously performed.

In the notification mode, in addition to the display by the display unit 13, sound output by the sound output unit 16 and light emission by the light-emitting unit 17 are performed.

Specifically, when the notification data ND obtained by the electronic timepiece 10 includes the sound information I3 related to the sound output mode, the sound output unit 16 outputs a sound in an output mode corresponding to the sound information I3 in the notification mode.

Further, when the notification data ND obtained by the electronic timepiece 10 includes the light emission information I4 related to the light emission mode, the light-emitting unit 17 emits light in a light emission mode (light emission pattern) corresponding to the light emission information I4 in the notification mode.

In the present illustrative embodiment, when an input operation (pressing operation) by the user is performed on the fourth operation button 144 (first operation accepting unit) in the notification mode, the sound output unit 16 outputs sound according to the sound information I3. Further, when an input operation (pressing operation) by the user is performed on the fifth operation button 145 (second operation accepting unit) in the notification mode, the light-emitting unit 17 emits light in a light emission mode according to the light emission information I4.

Note that, in the electronic timepiece 10 or the like in which the fifth operation button 145 is not provided, each time an input operation by the user is performed on a certain operation button (e.g., fourth operation button 144 (operation accepting unit)), a sound output control for causing the sound output unit 16 to output sound in the output mode according to the sound information I3 and a light emission control for causing the light-emitting unit 17 to emit light in the light emission mode according to the light emission information I4 may be executed so as to be alternately switched.

After the notification flag 122 is set to "1 (on)" in response to reception of the notification data ND, when any one of the first operation button 141 to the third operation button 143 is operated, the operation mode of the electronic timepiece 10 transitions to the basic timepiece mode shown in FIG. 3. Further, when the second operation button 142 is operated in this state, the operation mode again transitions to the notification mode shown in FIG. 6 if the notification flag 122 remains "1 (on)". That is, when the notification flag 122 is "1 (on)", the user can switch the operation mode between the notification mode and the basic timepiece mode by performing a predetermined operation.

The notification flag 122 is changed to "0 (off)" when a predetermined notification termination condition is satisfied. The notification termination condition in the present illustrative embodiment is satisfied when the time reaches 0:00 A.M. Therefore, after the notification flag 122 becomes "1 (on)" in response to reception of the notification data ND, if dates are crossed, the notification flag 122 is set to "0 (off)", and thereafter, the transition to the notification mode will not occur even though the second operation button 142 is operated. In addition, when the operation mode is the notification mode at 0:00 A.M., the operation mode transitions from the notification mode to the basic timepiece mode, in response to the notification flag 122 being set to "0 (off)".

Note that the notification termination condition is not limited to one exemplified above. For example, the notification termination condition may be assumed to be satisfied when a predetermined time other than 0:00 A.M. is reached, or when a predetermined operation (e.g., an operation of pressing and holding a predetermined operation button for a predetermined period of time or longer, or an operation of pressing two or more predetermined operations at the same time) is performed by the user.

{Notification Control Processing}

Next, notification control processing for performing the operation of the notification mode described above will be described.

Figure 8:
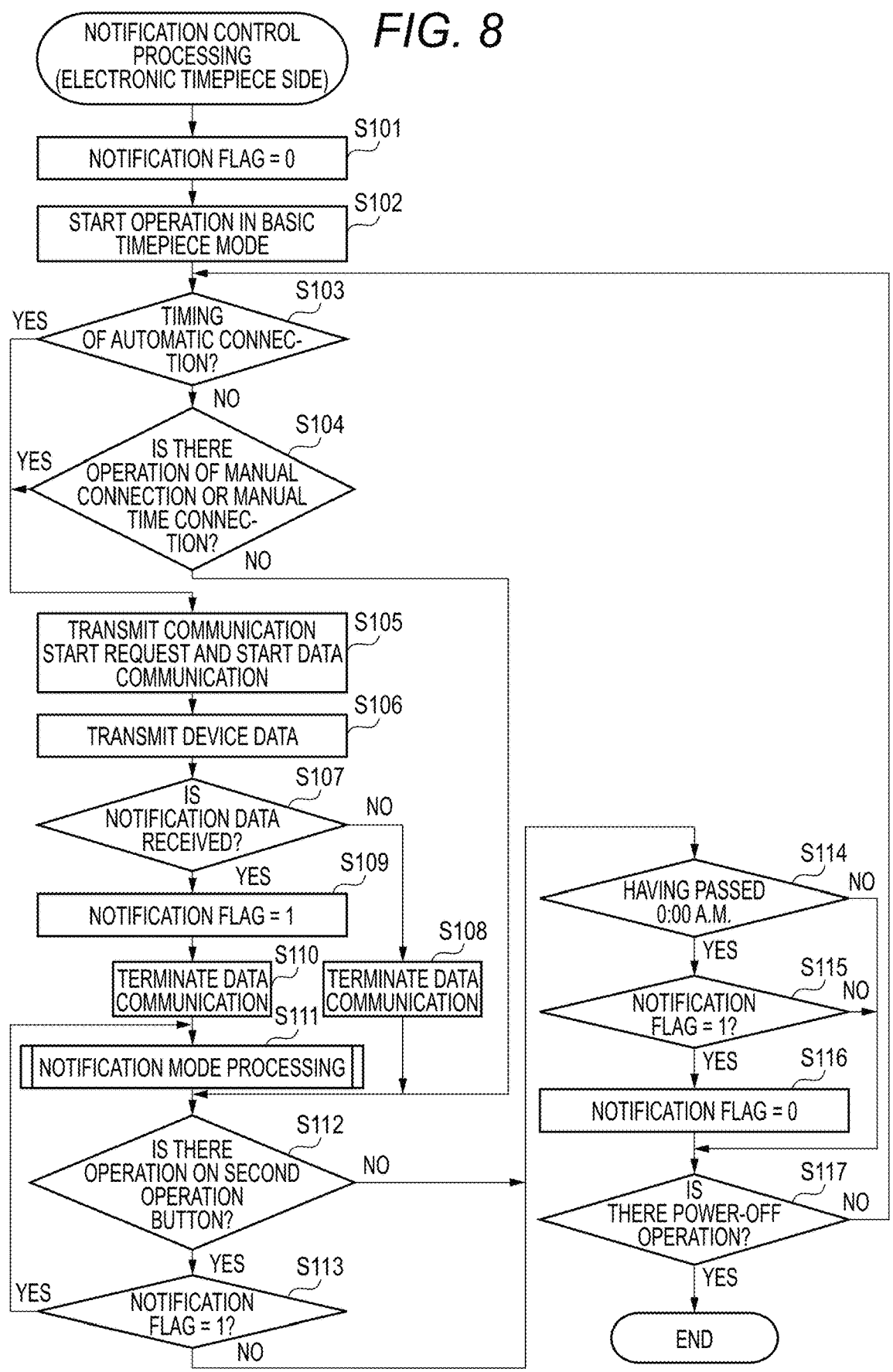
FIG. 8 is a flowchart showing a control procedure of notification control processing that is executed by a CPU of the electronic timepiece.

FIG. 8 is a flowchart showing a control procedure of notification control processing that is executed by the CPU 11 of the electronic timepiece 10.

The notification control processing is started when the electronic timepiece 10 is activated.

When the notification control processing is started, the CPU 11 sets the notification flag 122 to "0" (step S101), and starts an operation of each unit in the basic timepiece mode (step S102).

The CPU 11 determines whether it is a timing of automatic connection that is made four times in a day (step S103). If it is determined that it is not the timing of automatic connection ("NO" in step S103), the CPU determines whether an operation for the manual connection or manual time connection has been performed (step S104). If it is determined that it is the timing of automatic connection ("YES" in step S103), or if it is determined that the operation for the manual connection or manual time connection has been performed ("YES" in step S104), the CPU 11 causes the wireless communication unit 19 to transmit a communication start request (advertise packet in BLE), and to start data communication with the smart phone 20 (step S105). Note that, although not shown in FIG. 8, in the data communication, the CPU 11 receives time data for time correction, data related to various settings made on the cooperative application 221, and the like from the smart phone 20.

The CPU 11 transmits the device data 123 stored in the memory 12 at that time to the smart phone 20 (step S106) and resets the device data 123. Further, the CPU 11 determines whether the notification data ND has been received from the smart phone 20 within a predetermined standby period (step S107). Here, it is assumed that the notification flag information I1 of the received notification data ND is "1". If it is determined that the notification data ND has not been received within the standby period ("NO" in step S107), the CPU 11 terminates data communication with the smart phone 20 (step S108) and advances the processing to step S112. If it is determined that the notification data ND has been received ("YES" in step S107), the CPU 11 sets the notification flag 122 to "1" (step S109), terminates data communication with the smart phone 20 (step S110), and executes notification mode processing (step S111).

Figure 9A:
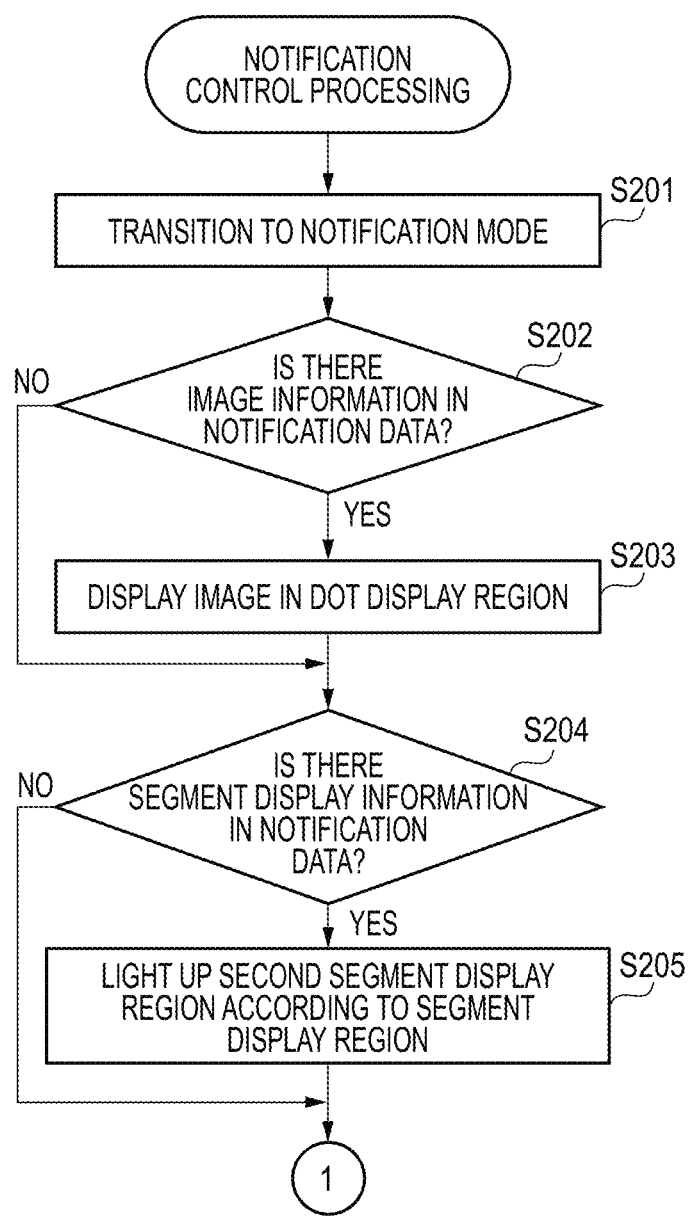
FIGS. 9A and 9B are a flowchart showing a control procedure of notification mode processing that is executed by the CPU of the electronic timepiece.
Figure 9B:
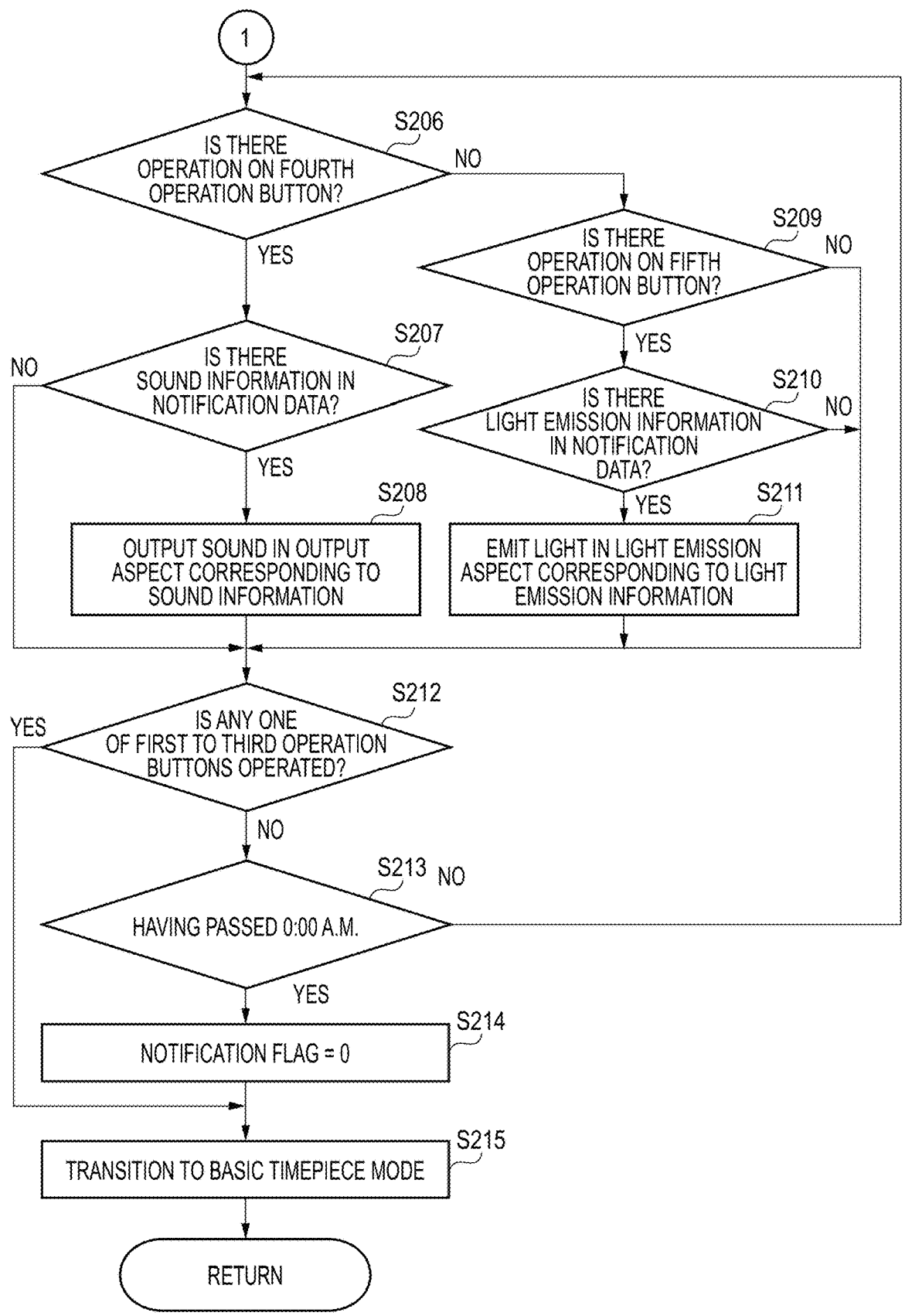

FIGS. 9A and 9B are a flowchart showing a control procedure of notification mode processing that is executed by the CPU 11 of the electronic timepiece 10.

When the notification mode processing is called up, the CPU 11 shifts the operation mode of the electronic timepiece 10 to the notification mode (step S201), and starts processing of step S202 and subsequent steps relating to the notification mode.

The CPU 11 determines whether the image information I2 is included in the received notification data ND (step S202). If it is determined that the image information I2 is included ("YES" in step S202), the CPU causes the image Im to be displayed in the dot display region 134 according to the image information I2 (step S203). Here, when the number of vertical dots of the image Im is larger than the number of vertical dots of the dot display region 134, the CPU 11 scrolls the image Im by the method described above.

When the processing of step S203 terminates, or if it is determined that the notification flag information I1 is not included in the notification data ND ("NO" in step S202), the CPU 11 determines whether the segment display information I6 is included in the notification data ND (step S204). If it is determined that the segment display information I6 is included ("YES" in step S204), the CPU 11 lights up segments in the second segment display region 132 according to the segment display information I6 for display (step S205).

When the processing of step S205 terminates, or if it is determined that the segment display information I6 is not included in the notification data ND ("NO" in step S204), the CPU 11 determines whether an operation on the fourth operation button 144 has been performed (step S206). If it is determined that an operation on the fourth operation button 144 has been performed ("YES" in step S206) and the sound information I3 is included in the notification data ND ("YES" in step S207), the CPU 11 causes the sound output unit 16 to output sound in the output mode corresponding to the sound information I3 (step S208). In addition, in parallel with the sound output by the sound output unit 16, the CPU may scroll once the image Im in the dot display region 134. When the processing of step S208 terminates, or if it is determined in step S207 that the sound information I3 is not included in the notification data ND ("NO" in step S207), the CPU 11 advances the processing to step S212.

On the other hand, if it is determined in step S206 that no operation has been performed on the fourth operation button 144 ("NO" in step S206), the CPU 11 determines whether an operation on the fifth operation button 145 has been performed (step S209). If it is determined that an operation on the fifth operation button 145 has been performed ("YES" in step S209) and the light emission information I4 is included in the notification data ND ("YES" in step S210), the CPU 11 causes the light-emitting unit 17 to emit light in the light emission mode corresponding to the light emission information I4 (step S211). In addition, in parallel with the light emission by the light-emitting unit 17, the CPU may scroll once the image Im in the dot display region 134. When the processing of step S211 terminates, if it is determined in step S209 that no operation has been performed on the fifth operation button 145 ("NO" in step S209), or if it is determined in step S210 that the light emission information I4 is not included in the notification data ND ("NO" in step S210), the CPU 11 advances the processing to step S212.

Note that when the electronic timepiece 10 is not provided with the fifth operation button 145, step S209 may be omitted, and step S207 and step S210 may be alternately executed each time it is determined in step S206 that the fourth operation button 144 has been operated.

In step S212, the CPU 11 determines whether an operation on any one of the first operation button 141 to the third operation button 143 has been performed. If it is determined that the operation has not been performed ("NO" in step S212), the CPU determines whether the time measured by the timer unit 15 has passed 0:00 A.M. (step S213). If it is determined that the time has passed 0:00 A.M. ("YES" in step S213), the CPU 11 determines that the notification termination condition of the notification mode is satisfied, and sets the notification flag 122 to "0" (step S214). If it is determined that the time has not passed 0:00 A.M. ("NO" in step S213), the CPU 11 returns the processing to step S206, and again accepts the user operations for instructing the sound output by the sound output unit 16 and the light emission by the light-emitting unit 17.

When the processing of step S214 is executed, or if it is determined in step S212 that an operation on any one of the first operation button 141 to the third operation button 143 has been performed ("YES" in step S212), the CPU 11 shifts the operation mode of the electronic timepiece 10 to the basic timepiece mode (step S215). That is, as shown in FIG. 3, the display in the dot display region 134 is switched to the display of the date, and the display in the second segment display region 132 is switched to the display of the seconds of the current time. When the processing of step S215 terminates, the CPU 11 terminates the notification mode processing and returns the processing to the notification control processing in FIG. 8.

Returning to FIG. 8, when the processing of step S108 or the notification mode processing of step S111 terminates, or if it is determined in step S104 that no operation for the manual connection and manual time connection has been performed ("NO" in step S104), the CPU 11 determines whether an operation on the second operation button 142 has been performed (step S112). If it is determined that an operation on the second operation button 142 has been performed ("YES" in step S112) and the notification flag 122 is "1" ("YES" in step S113), the CPU 11 returns the processing to S111, and executes the notification mode processing. On the other hand, if it is determined that an operation on the second operation button 142 has been performed ("YES" in step S112) and the notification flag 122 is "0" ("NO" in step S113), the CPU 11 determines whether the time measured by the timer unit 15 has passed 0:00 A.M. (step S114), without executing the notification mode processing. In addition, if it is determined in step S112 that no operation on the second operation button 142 has been performed ("NO" in step S112), the CPU 11 executes the processing of step S114.

If it is determined that the time has passed 0:00 A.M. ("YES" in step S114) and the notification flag 122 is "1" ("YES" in step S115), the CPU 11 determines that the notification termination condition of the notification mode is satisfied, and sets the notification flag 122 to "0" (step S116). When the processing of step S116 terminates, the CPU 11 advances the processing to step S117. On the other hand, if it is determined that the time has not passed 0:00 A.M. ("NO" in step S114), or if it is determined that the time has passed 0:00 A.M. ("YES" in step S114) and the notification flag 122 is "0" ("NO" in step S115), the CPU 11 advances the processing to step S117 without changing the notification flag 122.

In step S117, the CPU 11 determines whether an operation for turning off the power of the electronic timepiece 10 has been performed. The CPU 11 returns the processing to step S103 if it is determined that the above operation has not been performed ("NO" in step S117), and terminates the notification control processing if it is determined that the above operation has been performed ("YES" in step S117).

Note that, in the above description, it is assumed that the notification flag information I1 of the notification data ND received in step S107 is "1". However, if the notification flag information I1 of the received notification data ND is "0", the processing may be advanced to step S116 to set the notification flag 122 to "0".

Figure 10:
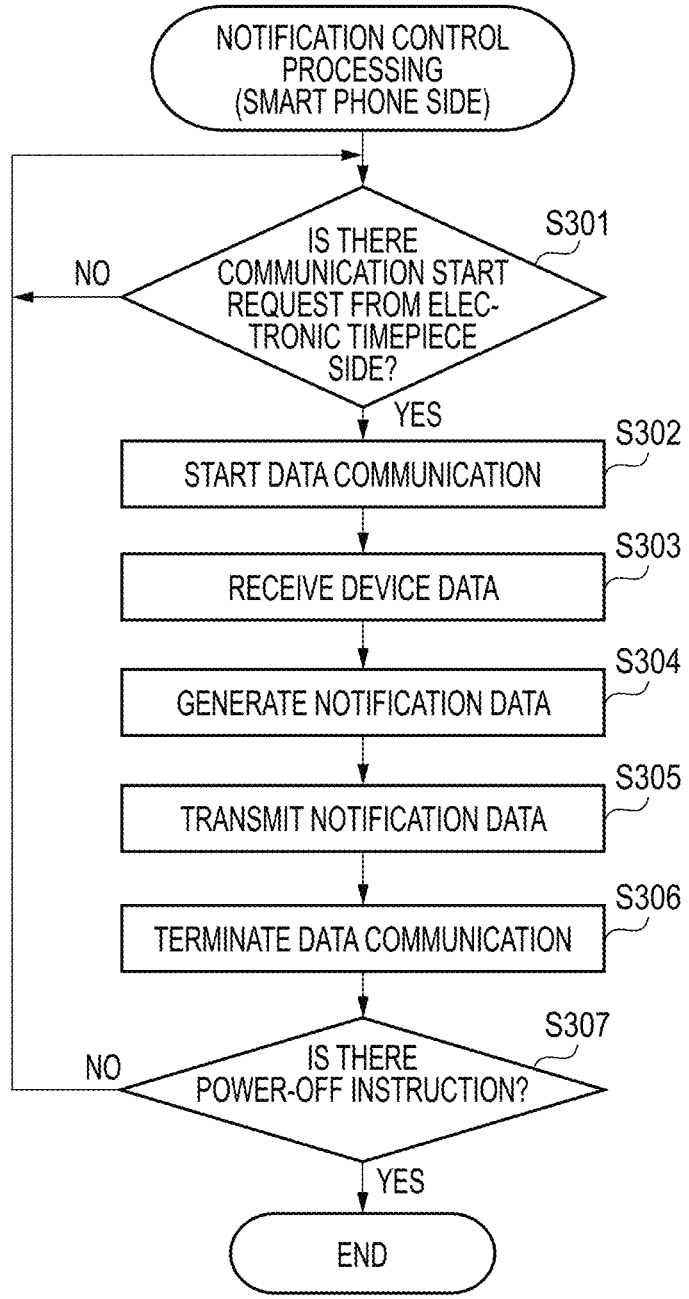
FIG. 10 is a flowchart showing a control procedure of notification control processing that is executed by a CPU of a smart phone.

FIG. 10 is a flowchart showing a control procedure of notification control processing that is executed by the CPU 21 of the smart phone 20.

The notification control processing is started when the smart phone 20 is activated.

When the notification control process is started, the CPU 21 determines whether a communication start request has been made from the electronic timepiece 10 (whether the BLE advertise packet has been transmitted) (step S301). If it is determined that a communication start request has been made (if an advertise packet is received), the CPU 21 starts data communication with the electronic timepiece 10 (step S302).

The CPU 21 receives the device data 123 from the electronic timepiece 10 in the started data communication (step S303), and generates the notification data ND based on the device data 123 (step S304).

Note that, in step S304, the notification data ND may be generated without being based on the device data 123 as described above. Further, in this case, the CPU 21 may generate the notification data ND in advance (for example, in a stage in which the CPU 21 acquires notification-related information) before data communication starts in step S302.

The CPU 21 transmits the generated notification data ND to the electronic timepiece 10 (step S305). Note that, although not shown in FIG. 10, in the data communication, time data for time correction, data related to various settings made on the cooperative application 221, and the like are also transmitted to the electronic timepiece 10.

After transmitting the notification data ND, the CPU 21 terminates data communication with the electronic timepiece 10 (step S306).

The CPU 21 determines whether an operation for turning off the power of the smart phone 20 has been performed (step S307). The CPU 21 returns the processing to step S301 if it is determined that the above operation has not been performed ("NO" in step S307), and terminates the notification control processing if it is determined that the above operation has been performed ("YES" in step S307).

{Advantages}

As described above, the electronic timepiece 10 according to the present illustrative embodiment includes the wireless communication unit 19, the display unit 13, and the CPU 11. The wireless communication unit 19 transmits a communication start request for starting data communication with the smart phone 20 to the smart phone 20, and performs data communication. The CPU 11 causes the wireless communication unit 19 to transmit a communication start request to the smart phone 20 and to start data communication with the smart phone 20 (step S105 in FIG. 8). When the notification data ND is obtained from the smart phone 20 ("YES" in step S107) in the started data communication, the CPU 11 shifts the operation mode of the own device (electronic timepiece 10) from the basic timepiece mode in which the display unit 13 displays a normal operation of the own device to the notification mode in which the display unit 13 performs a display based on the notification data ND (step S111, and step S201 in FIGS. 9A and 9B). As a result, even in a mode of communication connection in which push notification from the smart phone 20 to the electronic timepiece 10 cannot be performed, when information for the user is obtained or generated in the smart phone 20, notification to the user can be performed via the electronic timepiece 10 at the earliest possible timing. Therefore, the user can recognize that there is information for the user by checking the electronic timepiece 10 that has automatically transitioned to the notification mode, without checking the smart phone 20. The user who has checked the notification on the electronic timepiece 10 can timely access more detailed information on an application or the like on the smart phone 20. In this way, according to the configuration of the above illustrative embodiment, user convenience regarding access to information can be enhanced.

In addition, when it is determined that the own device is operating in the notification mode and the predetermined notification termination condition is satisfied ("YES" in step S213 in FIG. 9B), the CPU 11 switches the operation mode of the own device from the notification mode to the basic timepiece mode (step S215). This makes it possible not to continue the notification mode when there is no new information for the user. Therefore, when there is new information for the user, notification in the notification mode can be made in a timely manner.

Further, the electronic timepiece 10 includes the memory 12 in which the notification flag 122 related to the presence or absence of notification by the notification data ND is stored. When the notification data ND is obtained, the CPU 11 sets the notification flag 122 to ON (step S109 in FIG. 8). After setting the notification flag 122 to ON, when it is determined that the notification termination condition is satisfied ("YES" in step S114 in FIG. 8 or "YES" in step S213 in FIG. 9B), the CPU sets the notification flag 122 to OFF (step S116 in FIG. 8 or step S214 in FIG. 9B). When the notification flag 122 is ON, the CPU switches the operation mode of the own device between the notification mode and the basic timepiece mode, in response to a predetermined user operation (steps S111 to S113 in FIG. 8 and steps S201, S212 and S215 in FIG. 9B). When the notification flag 122 is OFF, the CPU does not perform the transition to the notification mode corresponding to the user operation. With this configuration, the user can switch and check information such as notification in the notification mode and time in the basic timepiece mode at a desired timing.

Further, the electronic timepiece 10 includes the timer unit 15 that measures a time, and when the time measured by the timer unit 15 reaches a predetermined time ("YES" in step S114 of FIG. 8, or "YES" in step S213 of FIG. 9B), the CPU 11 determines that the notification termination condition is satisfied. This makes it possible to prevent notification corresponding to one reception of the notification data ND from being continuously performed for one day or more. Therefore, when there is new information for the user, notification in the notification mode can be made in a timely manner.

Further, the display unit 13 has the dot display region 134 configured to display an image, and when the image information I2 related to an image is included in the obtained notification data ND, the CPU 11 causes the image Im based on the image information I2 to be displayed in the dot display region 134 of the display unit 13 in the notification mode (steps S202 and S203 in FIG. 9A). This allows for visually easy-to-understand notification using the image Im.

Further, the electronic timepiece 10 includes the sound output unit 16, and when the sound information I3 related to the sound output mode is included in the obtained notification data ND, the CPU 11 causes the sound output unit 16 to output sound in an output mode corresponding to the sound information I3 in the notification mode (steps S207 and S208 in FIG. 9B). This enables notification by sound of various output modes corresponding to the sound information I3, together with the display by the display unit 13.

Further, the electronic timepiece 10 includes the light-emitting unit 17, and when the light emission information I4 related to the light emission mode is included in the obtained notification data ND, the CPU 11 causes the light-emitting unit 17 to emit light in a light emission mode corresponding to the light emission information I4 in the notification mode (steps S209 and S210 in FIG. 9B). This enables notification by light emission of various light emission modes corresponding to the light emission information I4, together with the display by the display unit 13.

Further, the electronic timepiece 10 includes the fourth operation button 144 and the fifth operation button 145 that are input operation targets by the user. When the sound information I3 is included in the obtained notification data ND and an input operation has been performed on the fourth operation button 144 in the notification mode ("YES" in step S206 of FIG. 9B), the CPU 11 causes the sound output unit 16 to output sound in an output mode according to the sound information I3 (step S208), and when the light emission information I4 is included in the obtained notification data ND and an input operation has been performed on the fifth operation button 145 in the notification mode ("YES" in step S209), the CPU causes the light-emitting unit 17 to emit light in a light emission mode according to the light emission information I4 (step S211). Thereby, the user can cause the sound output unit 16 to output sound and the light-emitting unit 17 to emit light at a desired timing.

Further, in the case where the fifth operation button 145 is not provided, for example, when the sound information I3 and the light emission information I4 are included in the obtained notification data ND, the CPU 11 may alternately switch and execute the sound output control (step S208 in FIG. 9B) for causing the sound output unit 16 to output sound in an output mode according to the sound information I3 and the light emission control (step S211) for causing the light-emitting unit 17 to emit light in a light emission mode according to the light emission information I4 each time an input operation is performed on the fourth operation button 144 in the notification mode. Thereby, the user can cause the sound output unit 16 to output sound and the light-emitting unit 17 to emit light at a desired timing by using one operation button.

Further, in data communication, the CPU 11 transmits the device data 123, which includes at least one of the information related to the state of the own device and the information related to the operation history of the own device, to the smart phone 20, and acquires the notification data ND generated based on the device data 123 from the smart phone 20. This allows for notification in which the state and operation history of the own device are reflected.

Further, when the notification data ND is obtained, the CPU 11 causes the number of obtaining times or obtaining frequency of the notification data ND to be displayed in the second segment display region 132 of the display unit 13 in the notification mode. This allows for various notifications in which the user's usage conditions and the like of the electronic timepiece 10 are reflected.

In data communication with the smart phone 20, the electronic timepiece 10 corresponds to a peripheral. This makes it possible to start data communication with the smart phone 20 by transmitting an advertise packet from the electronic timepiece 10 (transmitting a communication start request).

Further, the control method of the electronic timepiece 10 according to the present illustrative embodiment causes the wireless communication unit 19 to transmit a communication start request to the smart phone 20 and to start data communication with the smart phone 20. When the notification data ND is obtained from the smart phone 20 in the started data communication, the control method shifts the operation mode of the electronic device from the basic timepiece mode in which the display unit 13 displays a normal operation of the electronic device to the notification mode in which the display unit 13 performs a display based on the notification data ND. As a result, even in a mode of communication connection in which push notification from the smart phone 20 to the electronic timepiece 10 cannot be performed, when information for the user is obtained or generated in the smart phone 20, notification to the user can be performed via the electronic timepiece 10 at the earliest possible timing. Therefore, user convenience regarding access to information can be enhanced.

Further, the program 121 according to the present illustrative embodiment causes the CPU 11 as a computer provided in the electronic timepiece 10 to execute processing of causing the wireless communication unit 19 to transmit a communication start request to the smart phone 20 and to start data communication with the smart phone 20, and processing of, when the notification data ND is obtained from the smart phone 20 in the started data communication, shifting the operation mode of the electronic device from the basic timepiece mode in which the display unit 13 displays a normal operation of the electronic device to the notification mode in which the display unit 13 performs a display based on the notification data ND. As a result, even in a mode of communication connection in which push notification from the smart phone 20 to the electronic timepiece 10 cannot be performed, when information for the user is obtained or generated in the smart phone 20, notification to the user can be performed via the electronic timepiece 10 at the earliest possible timing. Therefore, user convenience regarding access to information can be improved.

Second Illustrative Embodiment

Next, a second illustrative embodiment will be described. The information processing system 1 of the second illustrative embodiment is different from the first illustrative embodiment in that the display unit 13 of the electronic timepiece 10 can display a combination of a digital display and an analog display based on an indicator. In the below, differences from the first illustrative embodiment will be described, and the description of points in common with the first illustrative embodiment will be omitted.

Figure 11:
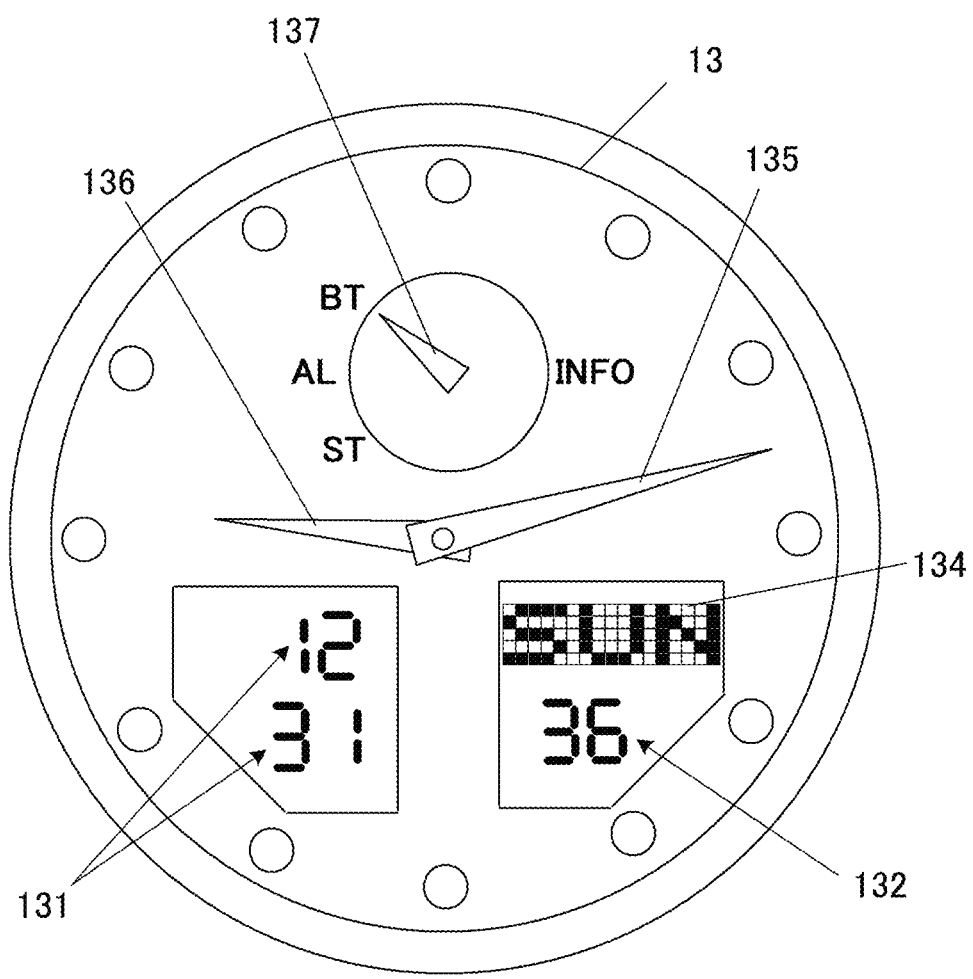
FIG. 11 is a view showing a display unit of an electronic timepiece according to a second illustrative embodiment.

FIG. 11 shows the display unit 13 of the electronic timepiece 10 according to the second illustrative embodiment.

FIG. 11 shows the display unit 13 when the electronic timepiece is operating in the basic timepiece mode. The display unit 13 of the electronic timepiece 10 of the present illustrative embodiment includes a minute hand 135, an hour hand 136, and a mode hand 137 for displaying information such as time in an analog manner, and a first segment display region 131, a second segment display region 132, and a dot display region 134 for displaying information such as a date and a day of the week in a digital manner. The first segment display region 131 of the present illustrative embodiment displays a date. In addition, a content that is displayed by at least one of the first segment display region 131, the second segment display region 132, and the dot display region 134 may be changed by operating a predetermined operation button. For example, each time the second operation button 142 is operated, the display content by the first segment display region 131 may be switched between a date and an hour and minute.

The mode hand 137 is an indicator configured to indicate any one of a plurality of different indicating positions, and is an indicator that displays an operation mode of the electronic timepiece 10. In the example shown in FIG. 11, when the mode hand 137 indicates an indicating position "BT", it represents that an operation mode is a basic timepiece mode, when the mode hand 137 indicates an indicating position of "AL", it represents that an operation mode is an alarm mode, when the mode hand 137 indicates an indicating position "ST", it represents that an operation mode is a stopwatch mode, and when the mode hand 137 indicates an indicating position "INFO", it represents that an operation mode is a notification mode.

Figure 12:
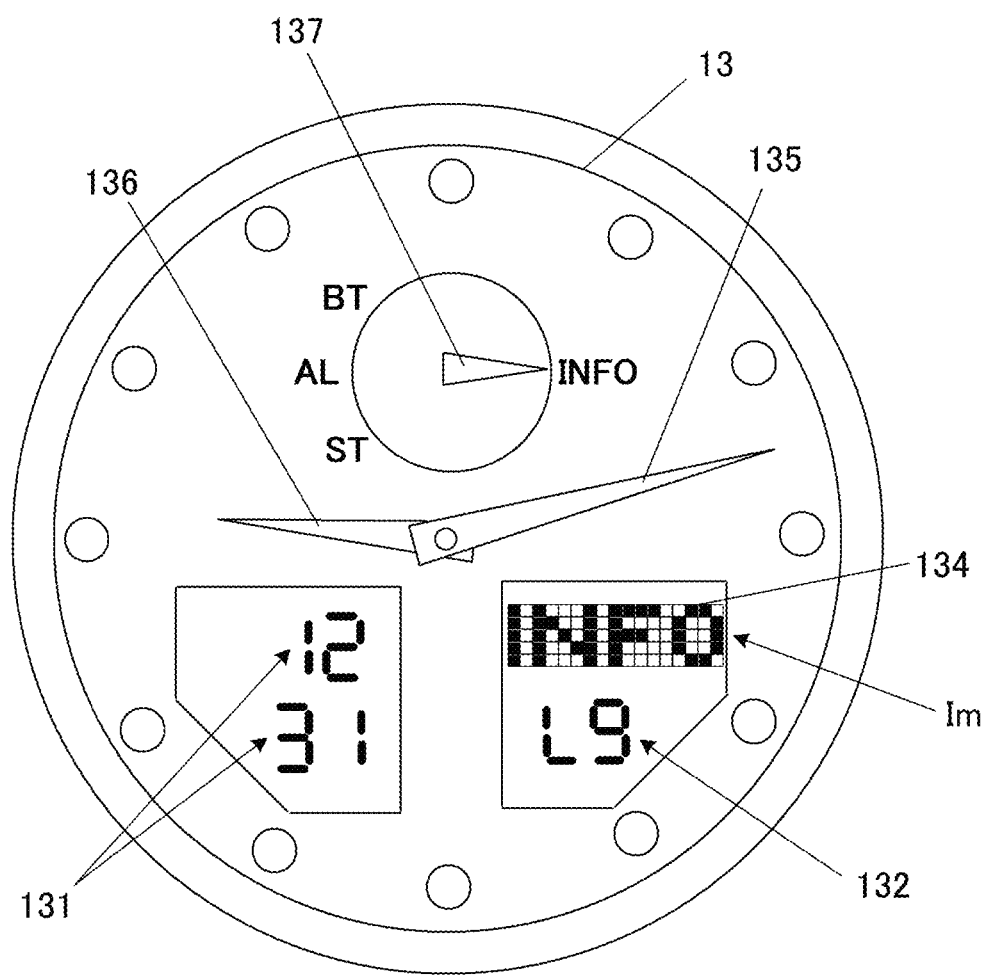
FIG. 12 is a view showing the display unit when the electronic timepiece according to the second illustrative embodiment is operating in the notification mode.

FIG. 12 is a view showing the display unit 13 when the electronic timepiece 10 according to the second illustrative embodiment is operating in the notification mode.

When transitioning to the notification mode, similar to the first illustrative embodiment, the image Im is displayed in the dot display region 134 and the user level is displayed in the second segment display region 132. In addition, based on the indicator indicating position information I5 of the notification data ND shown in FIG. 5, the indicating position of the mode hand 137 is changed to "INFO". In this way, in the electronic timepiece 10 of the present illustrative embodiment, in the notification mode, the notification mode is indicated by the mode hand 137, and the content based on the notification data ND is displayed in the dot display region 134 and the second segment display region 132. In addition, the sound output by the sound output unit 16 and/or the light emission by the light-emitting unit 17 may be performed.

Note that, in FIGS. 11 and 12, the electronic timepiece 10 that performs a combination of a digital display and an analog display has been exemplified. However, the present invention is not limited thereto. For example, a configuration is also possible in which only an analog display by an indicator is performed. Also in this case, in the notification mode, one or two or more indicators indicate the indicating position corresponding to the content of the notification data ND, so that necessary notification can be made to the user.

As described above, the display unit 13 according to the second illustrative embodiment has the mode hand 137 configured to indicate any one of a plurality of different indicating positions. When the indicator indicating position information I5 related to an indicating position of an indicator is included in the obtained notification data ND, the CPU 11 causes the mode hand 137 of the display unit 13 to indicate an indicating position corresponding to the indicator indicating position information I5 among the plurality of indicating positions in the notification mode. Thereby, it is possible to allow for the display, which indicates that an operation mode is the notification mode, and to display the information about the content of a notification, depending on the position of the indicator.

{Others}

Note that the description in the above illustrative embodiments is an example of the electronic device, the control method of an electronic device and the program according to the present disclosure, and is not limited thereto.

For example, although the electronic timepiece 10 has been exemplified as an electronic device, the present invention is not limited thereto. The electronic device may be a clock set up and used on a desk or a wall, or may be various devices other than a timepiece (for example, a wearable device worn on the body and used).

In addition, the external device is not limited to the smart phone 20, and may be a tablet-type terminal, a laptop computer, a stationary type PC, or the like.

In addition, although the digital display unit 13 has been exemplified as being configured by the 7-segment type display region or dot display region, the display unit is not limited thereto and may have a display region of an active matrix type. In this case, in the notification mode, detailed information corresponding to the resolution of the display region of the active matrix type may be displayed.

In addition, in the notification mode, at least one of the sound output by the sound output unit 16 and the light emission by the light-emitting unit 17 may not be performed.

When the sound output by the sound output unit 16 is not performed, the sound output unit 16 can be omitted, and the sound information I3 can be omitted in the notification data ND.

In addition, when the light emission by the light-emitting unit 17 is not performed, the light-emitting unit 17 can be omitted, and the light emission information I4 can be omitted in the notification data ND.

Further, in the above illustrative embodiments, in BLE communication, the electronic timepiece 10 corresponds to a peripheral (slave device), and the smart phone 20 corresponds to a central (master device), but the present invention is not limited thereto. The electronic timepiece 10 may correspond to a central (master device) and the smart phone 20 may correspond to a peripheral (slave device). In this case, in step S105 of the flowchart of FIG. 8, the reception of the communication start request from the smart phone 20 may trigger the start of communication processing by the wireless communication unit 19.

In the above description, the example where the memory 12 is used as a non-transitory computer-readable medium for the program of the present disclosure has been disclosed, but the present invention is not limited to this example. As other computer-readable media, information recording media such as HDD (which is an abbreviation for Hard Disk Drive), SSD (which is an abbreviation for Solid State Drive) and CD-ROM (which is an abbreviation for Compact Disc Read Only Memory) can be applied. In addition, as a medium for providing program data related to the present invention via a communication line, a carrier wave is also applied to the present disclosure.

Further, the detailed configuration and detailed operation of each component of the electronic timepiece 10 as an electronic device and the smart phone 20 as an external device in the above illustrative embodiments can be appropriately changed without departing from the scope of the present invention.

Although the illustrative embodiments of the present disclosure have been described, the scope of the present invention is not limited to the illustrative embodiments described above, and includes the scope of the invention recited in the claims and the scope of the equivalents thereof.

What is claimed is:

1. An electronic device comprising:
   a communication module configured to communicate with an external device having a battery capacity greater than a battery capacity of the electronic device;
   a display; and
   at least one processor configured to:
      control the communication module to transmit a communication start request to the external device; and
      whenever the electronic device receives notification information from the external device, change an operation mode of the electronic device from a first mode to a second mode,
   wherein the display performs displaying a normal operation of the electronic device in the first mode, and
   wherein the display performs displaying based on the notification information in the second mode,
   wherein whenever the processor determines that a predetermined notification termination condition is satisfied when the electronic device is operating in the second mode, the processor is configured to change the operation mode of the electronic device from the second mode to the first mode,
   wherein the electronic device further comprises a memory configured to store a notification setting including ON or OFF of a notification by the notification information,
   wherein the processor is further configured to:
      set the notification setting to ON based on obtaining the notification information;
      whenever the processor determines that the notification termination condition is satisfied after the notification setting is set to ON, set the notification setting to OFF;
      whenever the notification setting is ON, switch the operation mode of the electronic device between the second mode and the first mode in accordance with a user's operation; and
      whenever the notification setting is OFF, not to switch the operation mode to the second mode corresponding to the user's operation.

2. The electronic device according to claim 1, further comprising:
   a timer module configured to count a time,
   wherein whenever a time counted by the timer module is a predetermined time, the processor is configured to determine that the notification termination condition is satisfied.

3. The electronic device according to claim 1,
   wherein the display has an image display region configured to display an image, and
   wherein whenever the notification information includes image information, the processor is configured to control the display to display an image based on the image information in the image display region of the display in the second mode.

4. The electronic device according to claim 1,
   wherein the display includes an indicator configured to indicate one of a plurality of different indicating positions, and
   wherein whenever indicating position information is included in the obtained notification information, the processor is configured to control the indicator of the display to indicate a position corresponding to the indicating position information among the plurality of indicating positions in the second mode, wherein the indicating position information includes an indicating position of the indicator.

5. The electronic device according to claim 1, further comprising:
a speaker,
wherein whenever sound information is included in the obtained notification information, the processor is configured to control the speaker to output sound in an output mode corresponding to the sound information in the second mode, wherein the sound information includes an output mode of sound.

6. The electronic device according to claim 1, further comprising:
a light emitting diode (LED),
wherein whenever light emission information is included in the obtained notification information, the processor is configured to cause the LED to emit light in a light emission mode corresponding to the light emission information in the second mode, wherein the light emission information includes a light emission mode.

7. The electronic device according to claim 1, further comprising:
a speaker;
a light emitting diode (LED); and
a first operation interface and a second operation interface each configured to receive a user's input operation,
wherein the processor is configured to:
whenever sound information is included in the obtained notification information and the first operation interface receives the user's input operation in the second mode, control the speaker to output sound in an output mode corresponding to the sound information, wherein the sound information includes an output mode of sound; and
whenever light emission information is included in the obtained notification information and the second operation interface receives the user's input operation in the second mode, control the LED to emit light in a light emission mode corresponding to the light emission information, wherein the light emission information includes a light emission mode.

8. The electronic device according to claim 1, further comprising:
a speaker;
a light emitting diode (LED); and
an operation interface configured to receive a user's input operation,
wherein whenever sound information and light emission information are included in the obtained notification information, wherein the sound information includes an output mode of sound and the light emission information includes a light emission mode, each time the input operation is performed on the operation interface in the second mode, the processor is configured to alternately switch and perform:
a sound output control comprising controlling the speaker to output sound in an output mode according to the sound information; and
a light emission control comprising controlling the LED to emit light in a light emission mode according to the light emission information.

9. The electronic device according to claim 1, wherein the processor is configured to:
transmit device information to the external device, the device information comprising at least one of information related to a state of the electronic device and information related to an operation history of the electronic device; and
obtain the notification information generated based on the device information from the external device.

10. The electronic device according to claim 1, wherein the processor is configured to control the display to display a number of times or a frequency of obtaining of the notification information in the second mode based on obtaining the notification information.

11. The electronic device according to claim 1, wherein in a data communication with the external device, the electronic device corresponds to a peripheral.

12. A control method of an electronic device, the electronic device comprising a display and a communication module configured to communicate with an external device having a battery capacity greater than a battery capacity of the electronic device, the control method comprising:
controlling the communication module to transmit a communication start request to the external device;
receiving, by the electronic device, notification information from the external device, and changing an operation mode of the electronic device from a first mode to a second mode, the display performing displaying a normal operation of the electronic device in the first mode, and the display performing displaying based on the notification information in the second mode;
whenever it is determined that a predetermined notification termination condition is satisfied when the electronic device is operating in the second mode, changing the operation mode of the electronic device from the second mode to the first mode;
storing a notification setting including ON or OFF of a notification by the notification information in a memory of the electronic device;
setting the notification setting to ON based on obtaining the notification information;
whenever it is determined that the notification termination condition is satisfied after the notification setting is set to ON, setting the notification setting to OFF;
whenever the notification setting is ON, switching the operation mode of the electronic device between the second mode and the first mode in accordance with a user's operation; and
whenever the notification setting is OFF, not switching the operation mode to the second mode corresponding to the user's operation.

13. The control method according to claim 12, further comprising:
whenever a time counted by a timer module of the electronic device is a predetermined time, determining that the notification termination condition is satisfied.

14. The control method according to claim 12, further comprising controlling the display to display an image based on image information included in the obtained notification information in an image display region of the display in the second mode.

15. The method according to claim 12,
wherein the display of the electronic device includes an indicator configured to indicate one of a plurality of different indicating positions, and
wherein the control method further comprises controlling the indicator of the display to indicate a position corresponding to indicating position information included in the obtained notification information, from among the plurality of indicating positions in the second mode, wherein the indicating position information includes an indicating position of the indicator.

16. A non-transitory computer-readable medium storing a computer program readable by a computer of an electronic device, the electronic device comprising a display and a communication module configured to communicate with an external device having a battery capacity greater than a battery capacity of the electronic device, the computer program, when executed by the computer, causing the computer to perform:
- controlling the communication module to transmit a communication start request to the external device;
- whenever the electronic device receives notification information from the external device, changing an operation mode of the electronic device from a first mode to a second mode, the display performing displaying a normal operation of the electronic device in the first mode, and the display performing displaying based on the notification information in the second mode;
- whenever it is determined that a predetermined notification termination condition is satisfied when the electronic device is operating in the second mode, changing the operation mode of the electronic device from the second mode to the first mode;
- storing a notification setting including ON or OFF of a notification by the notification information in a memory of the electronic device;
- setting the notification setting to ON based on obtaining the notification information;
- whenever it is determined that the notification termination condition is satisfied after the notification setting is set to ON, setting the notification setting to OFF;
- whenever the notification setting is ON, switching the operation mode of the electronic device between the second mode and the first mode in accordance with a user's operation; and
- whenever the notification setting is OFF, not switching the operation mode to the second mode corresponding to the user's operation.

17. The non-transitory computer-readable medium according to claim 16, wherein the computer program, when executed by the computer, causes the computer to further perform:
- whenever a time counted by a timer module of the electronic device is a predetermined time, determining that the notification termination condition is satisfied.

18. The non-transitory computer-readable medium according to claim 16,
wherein the computer program, when executed by the computer, causes the computer to further perform:
- whenever the notification information includes image information, controlling the display to display an image based on the image information in an image display region of the display in the second mode.

19. The non-transitory computer-readable medium according to claim 16,
wherein the display of the electronic device includes an indicator configured to indicate one of a plurality of different indicating positions, and
wherein the computer program, when executed by the computer, causes the computer to further perform:
- whenever indicating position information is included in the obtained notification information, controlling the indicator of the display to indicate a position corresponding to the indicating position information among the plurality of indicating positions in the second mode, wherein the indicating position information includes an indicating position of the indicator.

* * * * *